(12) United States Patent
Kuwaoka

(10) Patent No.: US 7,024,260 B2
(45) Date of Patent: Apr. 4, 2006

(54) METHOD AND APPARATUS FOR PROCESSING DIGITAL AUDIO SIGNAL

(75) Inventor: Toshiharu Kuwaoka, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 904 days.

(21) Appl. No.: 09/986,369

(22) Filed: Nov. 8, 2001

(65) Prior Publication Data

US 2002/0075777 A1 Jun. 20, 2002

(30) Foreign Application Priority Data

Dec. 20, 2000 (JP) .............................. 2000-386957

(51) Int. Cl.
- G06F 17/00 (2006.01)
- H03G 3/00 (2006.01)
- H03G 5/00 (2006.01)
- H03G 7/00 (2006.01)
- H03G 9/00 (2006.01)
- G10H 7/00 (2006.01)

(52) U.S. Cl. .......................... 700/94; 381/61; 381/101; 381/102; 381/106; 84/616

(58) Field of Classification Search ................. 700/94; 381/61, 101, 102, 106; 704/225; 327/90, 327/119; 360/32; 84/604, 616, 622, 654, 84/659, 681

See application file for complete search history.

(56) References Cited

U.S. PATENT DOCUMENTS 6,449,519 B1 * 9/2002 Kuwaoka ..................... 700/94

FOREIGN PATENT DOCUMENTS

| JP | 11-126097 | 5/1999 |
| JP | 11-144382 | 5/1999 |

* cited by examiner

Primary Examiner—Vivian Chin
Assistant Examiner—Andrew C Flanders
(74) Attorney, Agent, or Firm—Louis Woo

(57) ABSTRACT

Maximal and minimal values represented by samples of a digital audio signal are detected. A number of samples from a sample representing a minimal value to a maximal-value-corresponding sample is detected. A number of samples from a sample representing a maximal value to a minimal-value-corresponding sample is detected. Calculation is given of a first difference between the maximal-value-corresponding sample and the immediately-preceding sample. Calculation is given of a second difference between the minimal-value-corresponding sample and the immediately-preceding sample. First and second coefficients are calculated from the detected sample numbers. The first coefficient and the first difference are multiplied to generate a first multiplication result. The second coefficient and the second difference are multiplied to generate a second multiplication result. The maximal value represented by the maximal-value-corresponding sample is incremented by the first multiplication result. The minimal value represented by the minimal-value-corresponding sample is decremented by the second multiplication result.

9 Claims, 10 Drawing Sheets

FIG. 3

| SAMPLE NUMBER | COEFFICIENTS Amax Amin |
|---|---|
| 1 | 1/2 |
| 2 | 1/2 |
| 3 | 1/2 |
| 4 | 1/2 |
| 5 | 1/2 |
| 6 | 1/4 |
| 7 | 1/4 |
| 8 | 1/4 |
| 9 | 1/4 |
| 10 | 1/8 |
| 11 | 1/8 |
| 12 | 1/8 |
| 13 | 1/8 |
| 14 | 1/8 |
| 15 | 1/16 |
| 16 | 1/16 |
| . | . |
| . | . |
| . | . |

FIG. 6

| SAMPLE NUMBER | COEFFICIENTS $A_{max1}$ $A_{min1}$ | COEFFICIENTS $A_{max2}$ $A_{min2}$ |
|---|---|---|
| 1 | 1/2 | 1/4 |
| 2 | 1/2 | 1/4 |
| 3 | 1/2 | 1/4 |
| 4 | 1/2 | 1/4 |
| 5 | 1/2 | 1/4 |
| 6 | 1/4 | 1/8 |
| 7 | 1/4 | 1/8 |
| 8 | 1/4 | 1/8 |
| 9 | 1/4 | 1/8 |
| 10 | 1/8 | 1/16 |
| 11 | 1/8 | 1/16 |
| 12 | 1/8 | 1/16 |
| 13 | 1/8 | 1/16 |
| 14 | 1/8 | 1/16 |
| 15 | 1/16 | 1/32 |
| 16 | 1/16 | 1/32 |
| . | . | . |
| . | . | . |
| . | . | . |

FIG. 9

| SAMPLE NUMBER | COEFFICIENT $\alpha$ |
|---|---|
| 2 | 0, 0 : 1/2<br>0, 1 : 1/4<br>1, 0 : 1/8<br>1, 1 : 1/16 |
| 3 | 0, 0 : 1/2<br>0, 1 : 1/4<br>1, 0 : 1/8<br>1, 1 : 1/16 |
| 4 | 0, 0 : 1/4<br>0, 1 : 1/8<br>1, 0 : 1/16<br>1, 1 : 1/32 |
| 5 | 0, 0 : 1/4<br>0, 1 : 1/8<br>1, 0 : 1/16<br>1, 1 : 1/32 |
| 6 | 0, 0 : 1/8<br>0, 1 : 1/16<br>1, 0 : 1/32<br>1, 1 : 1/64 |
| 7 | 0, 0 : 1/8<br>0, 1 : 1/16<br>1, 0 : 1/32<br>1, 1 : 1/64 |
| 8 | 0, 0 : 1/16<br>0, 1 : 1/32<br>1, 0 : 1/64<br>1, 1 : 1/128 |

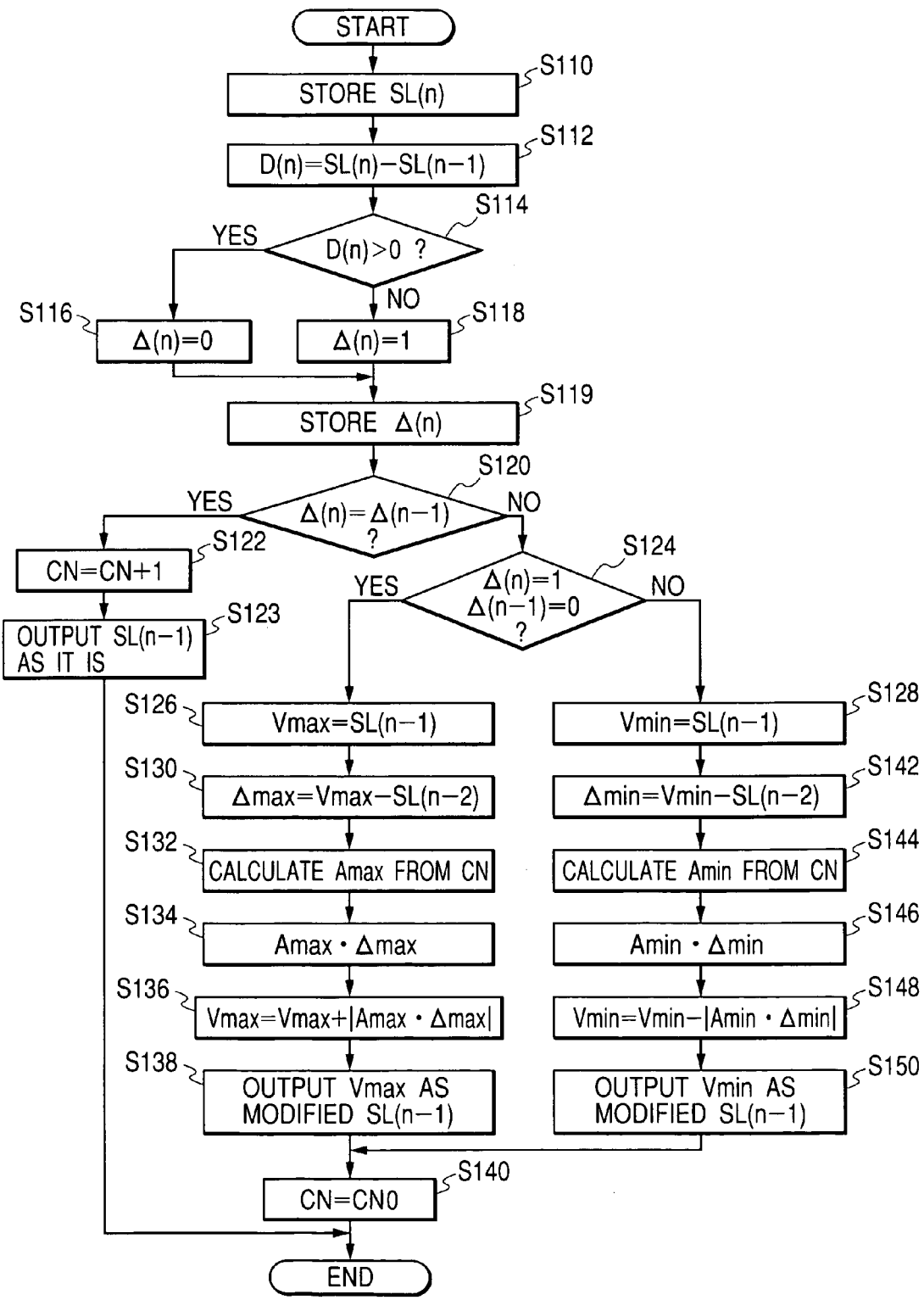

METHOD AND APPARATUS FOR PROCESSING DIGITAL AUDIO SIGNAL

BACKGROUND OF THE INVENTION

1. Field of the Invention

This invention relates to an apparatus for processing a digital audio signal. In addition, this invention relates to a method of processing a digital audio signal. Furthermore, this invention relates to a recording medium which stores a computer program for processing a digital audio signal.

2. Description of the Related Art

According to the CD (compact disc) standards, an analog audio signal is converted into a digital audio signal at a sampling frequency fs of 44.1 kHz and a quantization bit number of 16. Generally, a higher sampling frequency and a larger quantization bit number provide a better tone quality. There is a DVD (digital versatile disc) family having a DVD-video and a DVD-audio. According to the DVD-video standards and the DVD-audio standards, the sampling frequency fs is equal to 48 kHz, 96 kHz, or 192 kHz while the quantization bit number is equal to, for example, 24.

Japanese patent application publication number 11-126097/1999 discloses an apparatus for processing a digital audio signal. The apparatus in Japanese application 11-126097 includes a bit converter receiving a first digital audio signal (an input digital audio signal) having a sequence of 16-bit samples which relates to a sampling frequency of 44.1 kHz. The bit converter changes every 16-bit sample of the input digital audio signal into a corresponding 24-bit sample. Thus, the first digital audio signal is converted into a second digital audio signal having a sequence of 24-bit samples which relates to a sampling frequency of 44.1 kHz. The apparatus also includes a sampling-rate converter receiving the second digital audio signal. The sampling-rate converter over-samples the second digital audio signal, thereby generating a third digital audio signal having a sequence of 24-bit samples which relates to a sampling frequency of 96 kHz. The apparatus in Japanese application 11-126097 further includes a higher-harmonic generator receiving the third digital audio signal.

The higher-harmonic generator in the apparatus of Japanese application 11-126097 compares every sample of the third digital audio signal with the immediately-preceding sample thereof to generate a binary signal (a 0–1 signal) representing the comparison result. When the signal level represented by the present sample is greater than that represented by the immediately-preceding sample, the comparison-result signal is "0". Otherwise, the comparison-result signal is "1". In response to the comparison-result signal, the higher-harmonic generator detects samples of the third digital audio signal which correspond to signal-level peaks and valleys. The higher-harmonic generator implements a pattern matching procedure for the 0–1 pattern represented by the comparison-result signal which occurs during the time interval from every signal-level peak to a following signal-level valley, and also the 0–1 pattern represented by the comparison-result signal which occurs during the time interval from every signal-level valley to a following signal-level peak. Specifically, the higher-harmonic generator decides which of predetermined reference patterns the peak-to-valley 0–1 pattern and the valley-to-peak 0–1 pattern match with. On the basis of the matching reference patterns, the higher-harmonic generator produces a sequence of 24-bit samples of a digital emphasis signal which relates to a sampling frequency of 96 kHz.

The apparatus in Japanese application 11-126097 includes an adder which combines the third digital audio signal and the digital emphasis signal into a fourth digital audio signal. The fourth digital audio signal is wider in frequency band than the input digital audio signal (the first digital audio signal). The apparatus records the fourth digital audio signal on a recording medium.

In the apparatus of Japanese application 11-126097, each of the reference patterns relates to the number of samples in the time interval from the signal-level peak to the following signal-level valley or the time interval from the signal-level valley to the following signal-level peak. Therefore, the pattern matching detects the number of samples in the time interval from every signal-level peak to the following signal-level valley and the number of samples in the time interval from every signal-level valley to the following signal-level peak. A coefficient is calculated from each of the detected sample numbers. The difference between each peak-corresponding or valley-corresponding sample of the third digital audio signal and the immediately-preceding sample thereof is multiplied by the calculated coefficient. The multiplication result is added to samples of the third digital audio signal which are temporally near the peak-corresponding sample. The multiplication result is subtracted from samples of the third digital audio signal which are temporally near the valley-corresponding sample. As a result, the third digital audio signal is converted or modified into the fourth digital audio signal.

Japanese patent application publication number 11-144382/1999 discloses an apparatus for processing a digital audio signal. The apparatus in Japanese application 11-144382 includes a bit converter receiving a first digital audio signal (an input digital audio signal) having a sequence of 16-bit samples which relates to a sampling frequency of 44.1 kHz. The bit converter changes every 16-bit sample of the input digital audio signal into a corresponding 24-bit sample. Thus, the first digital audio signal is converted into a second digital audio signal having a sequence of 24-bit samples which relates to a sampling frequency of 44.1 kHz. The apparatus also includes a sampling-rate converter receiving the second digital audio signal. The sampling-rate converter over-samples the second digital audio signal, thereby generating a third digital audio signal having a sequence of 24-bit samples which relates to a sampling frequency of 96 kHz. The apparatus in Japanese application 11-144382 further includes a trapezoid waveform generator receiving the third digital audio signal.

The trapezoid waveform generator in the apparatus of Japanese application 11-144382 compares every sample of the third digital audio signal with immediately-preceding sample thereof to generate a binary signal (a 0–1 signal) representing the comparison result. When the signal level represented by the present sample is greater than that represented by the immediately-preceding sample, the comparison-result signal is "0". Otherwise, the comparison-result signal is "1". In response to the comparison-result signal, the trapezoid waveform generator detects samples of the third digital audio signal which correspond to signal-level peaks and valleys. On the basis of the detected peak-corresponding samples and the detected valley-corresponding samples, the trapezoid waveform generator produces a sequence of 24-bit samples of a corrective digital signal which relates to a sampling frequency of 96 kHz. The corrective digital signal represents trapezoid waveforms centered at the detected peak-corresponding samples and the detected valley-corresponding samples.

The apparatus in Japanese application 11-144382 includes a high pass filter which receives the corrective digital signal. The high pass filter processes the corrective digital signal into a digital emphasis signal which has a sequence of 24-bit samples, and which relates to a sampling frequency of 96 kHz. The apparatus further includes an adder which combines the third digital audio signal and the digital emphasis signal into a fourth digital audio signal. The fourth digital audio signal is wider in frequency band than the input digital audio signal (the first digital audio signal). The apparatus records the fourth digital audio signal on a recording medium.

SUMMARY OF THE INVENTION

It is a first object of this invention to provide an apparatus for processing a digital audio signal which is improved over prior art in tone sharpness, tone reality, and tone clearness.

It is a second object of this invention to provide a method of processing a digital audio signal which is improved over prior art in tone sharpness, tone reality, and tone clearness.

It is a third object of this invention to provide recording medium storing a computer program for processing a digital audio signal which is improved over prior art in tone sharpness, tone reality, and tone clearness.

A first aspect of this invention provides an apparatus for processing a digital audio signal having a sequence of samples. The apparatus comprises first means for detecting maximal values and minimal values represented by samples of the digital audio signal; second means for detecting a number of samples from a sample representing a minimal value detected by the first means to a maximal-value-corresponding sample representing a maximal value detected by the first means; third means for detecting a number of samples from a sample representing a maximal value detected by the first means to a minimal-value-corresponding sample representing a minimal value detected by the first means; fourth means for calculating a first difference between the maximal value represented by the maximal-value-corresponding sample and a value represented by a sample immediately preceding the maximal-value-corresponding sample; fifth means for calculating a second difference between the minimal value represented by the minimal-value-corresponding sample and a value represented by a sample immediately preceding the minimal-value-corresponding sample;

sixth means for calculating a first coefficient from the sample number detected by the second means; seventh means for calculating a second coefficient from the sample number detected by the third means; eighth means for multiplying the first coefficient and the first difference to generate a first multiplication result; ninth means for multiplying the second coefficient and the second difference to generate a second multiplication result; tenth means for incrementing the maximal value, represented by the maximal-value-corresponding sample, by the first multiplication result to modify the maximal-value-corresponding sample; and eleventh means for decrementing the minimal value, represented by the minimal-value-corresponding sample, by the second multiplication result to modify the minimal-value-corresponding sample.

A second aspect of this invention is based on the first aspect thereof, and provides an apparatus further comprising twelfth means for calculating a third coefficient from the sample number detected by the second means; thirteenth means for calculating a fourth coefficient from the sample number detected by the third means; fourteenth means for multiplying the third coefficient and the first difference to generate a third multiplication result; fifteenth means for multiplying the fourth coefficient and the second difference to generate a fourth multiplication result; sixteenth means for incrementing a value of a sample near the maximal-value-corresponding sample by the third multiplication result to modify the sample near the maximal-value-corresponding sample; and seventeenth means for decrementing a value of a sample near the minimal-value-corresponding sample by the fourth multiplication result to modify the sample near the minimal-value-corresponding sample.

A third aspect of this invention is based on the first aspect thereof, and provides an apparatus wherein the first coefficient increases as the sample number detected by the second means decreases, and the second coefficient increases as the sample number detected by the third means decreases.

A fourth aspect of this invention provides a recording medium storing a computer program for processing a digital audio signal having a sequence of samples. The computer program comprises the steps of (1) detecting maximal values and minimal values represented by samples of the digital audio signal; (2) detecting a number of samples from a sample representing a minimal value detected by the step (1) to a maximal-value-corresponding sample representing a maximal value detected by the step (1); (3) detecting a number of samples from a sample representing a maximal value detected by the step (1) to a minimal-value-corresponding sample representing a minimal value detected by the step (1); (4) calculating a first difference between the maximal value represented by the maximal-value-corresponding sample and a value represented by a sample immediately preceding the maximal-value-corresponding sample; (5) calculating a second difference between the minimal value represented by the minimal-value-corresponding sample and a value represented by a sample immediately preceding the minimal-value-corresponding sample; (6) calculating a first coefficient from the sample number detected by the step (2); (7) calculating a second coefficient from the sample number detected by the step (3); (8) multiplying the first coefficient and the first difference to generate a first multiplication result; (9) multiplying the second coefficient and the second difference to generate a second multiplication result; (10) incrementing the maximal value, represented by the maximal-value-corresponding sample, by the first multiplication result to modify the maximal-value-corresponding sample; and (11) decrementing the minimal value, represented by the minimal-value-corresponding sample, by the second multiplication result to modify the minimal-value-corresponding sample.

A fifth aspect of this invention is based on the fourth aspect thereof, and provides a recording medium wherein the computer program further comprises the steps of (12) calculating a third coefficient from the sample number detected by the step (2); (13) calculating a fourth coefficient from the sample number detected by the step (3); (14) multiplying the third coefficient and the first difference to generate a third multiplication result; (15) multiplying the fourth coefficient and the second difference to generate a fourth multiplication result; (16) incrementing a value of a sample near the maximal-value-corresponding sample by the third multiplication result to modify the sample near the maximal-value-corresponding sample; and (17) decrementing a value of a sample near the minimal-value-corresponding sample by the fourth multiplication result to modify the sample near the minimal-value-corresponding sample.

A sixth aspect of this invention is based on the fourth aspect thereof, and provides a recording medium wherein the first coefficient increases as the sample number detected by the step (2) decreases, and the second coefficient increases as the sample number detected by the step (3) decreases.

A seventh aspect of this invention provides an apparatus for processing a digital audio signal having a sequence of samples. The apparatus comprises first means for detecting first and second specific samples among the samples of the digital audio signal, the first and second specific samples corresponding to temporally-adjacent extremes in signal level represented by the sequence of the samples, the extremes including a maximal value and a minimal value; second means for detecting a number of samples of the digital audio signal between the first and second specific samples; third means for calculating a difference between a value represented by the second specific sample and a sample of the digital audio signal which immediately precedes the second specific sample; and fourth means for modifying the second specific sample in response to the number detected by the second means and in response to the difference calculated by the third means.

An eighth aspect of this invention provides a method of processing a digital audio signal having a sequence of samples. The method comprises the steps of (1) detecting first and second specific samples among the samples of the digital audio signal, the first and second specific samples corresponding to temporally-adjacent extremes in signal level represented by the sequence of the samples, the extremes including a maximal value and a minimal value; (2) detecting a number of samples of the digital audio signal between the first and second specific samples; (3) calculating a difference between a value represented by the second specific sample and a sample of the digital audio signal which immediately precedes the second specific sample; and (4) modifying the second specific sample in response to the number detected by the step (2) and in response to the difference calculated by the step (3).

A ninth aspect of this invention provides a method of processing a digital audio signal having a sequence of samples. The method comprises the steps of (1) detecting maximal values and minimal values represented by samples of the digital audio signal; (2) detecting a number of samples from a sample representing a minimal value detected by the step (1) to a maximal-value-corresponding sample representing a maximal value detected by the step (1); (3) detecting a number of samples from a sample representing a maximal value detected by the step (1) to a minimal-value-corresponding sample representing a minimal value detected by the step (1); (4) calculating a first difference between the maximal value represented by the maximal-value-corresponding sample and a value represented by a sample immediately preceding the maximal-value-corresponding sample; (5) calculating a second difference between the minimal value represented by the minimal-value-corresponding sample and a value represented by a sample immediately preceding the minimal-value-corresponding sample; (6) calculating a first coefficient from the sample number detected by the step (2); (7) calculating a second coefficient from the sample number detected by the step (3); (8) multiplying the first coefficient and the first difference to generate a first multiplication result; (9) multiplying the second coefficient and the second difference to generate a second multiplication result; (10) incrementing the maximal value, represented by the maximal-value-corresponding sample, by the first multiplication result to modify the maximal-value-corresponding sample; and (11) decrementing the minimal value, represented by the minimal-value-corresponding sample, by the second multiplication result to modify the minimal-value-corresponding sample.

A tenth aspect of this invention is based on the ninth aspect thereof, and provides a method further comprising the steps of (12) calculating a third coefficient from the sample number detected by the step (2); (13) calculating a fourth coefficient from the sample number detected by the step (3); (14) multiplying the third coefficient and the first difference to generate a third multiplication result; (15) multiplying the fourth coefficient and the second difference to generate a fourth multiplication result; (16) incrementing a value of a sample near the maximal-value-corresponding sample by the third multiplication result to modify the sample near the maximal-value-corresponding sample; and (17) decrementing a value of a sample near the minimal-value-corresponding sample by the fourth multiplication result to modify the sample near the minimal-value-corresponding sample.

An eleventh aspect of this invention is based on the ninth aspect thereof, and provides a method wherein the first coefficient increases as the sample number detected by the step (2) decreases, and the second coefficient increases as the sample number detected by the step (3) decreases.

A twelfth aspect of this invention provides a recording medium storing a computer program for processing a digital audio signal having a sequence of samples. The computer program comprises the steps of (1) detecting first and second specific samples among the samples of the digital audio signal, the first and second specific samples corresponding to temporally-adjacent extremes in signal level represented by the sequence of the samples, the extremes including a maximal value and a minimal value; (2) detecting a number of samples of the digital audio signal between the first and second specific samples; (3) calculating a difference between a value represented by the second specific sample and a sample of the digital audio signal which immediately precedes the second specific sample; and (4) modifying the second specific sample in response to the number detected by the step (2) and in response to the difference calculated by the step (3).

BRIEF DESCRIPTION OF THE DRAWINGS

FIG. 3 is a diagram of an example of the contents of tables each indicative of a predetermined relation between a coefficient and a sample number in the apparatus of FIG. 1.

FIG. 6 is a diagram of an example of the contents of tables each indicative of a predetermined relation between a coefficient and a sample number in the apparatus of FIG. 5.

FIG. 9 is a diagram of an example of the contents of a table indicative of a predetermined relation between a coefficient and a sample number in the apparatus of FIG. 8.

FIG. 14 is a flowchart of a segment of a control program for a computer in FIG. 13.

DETAILED DESCRIPTION OF THE INVENTION

First Embodiment

Figure 1:
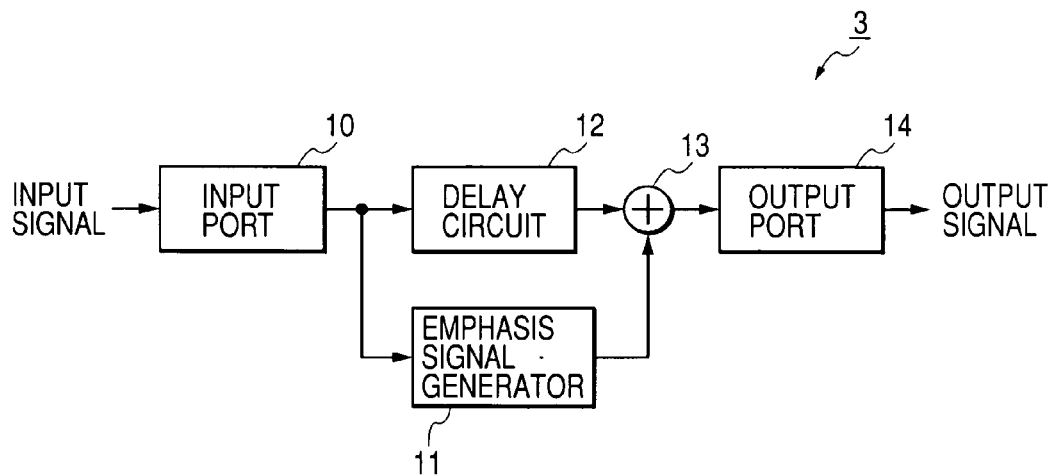
FIG. 1 is a block diagram of an apparatus for processing a digital audio signal according to a first embodiment of this invention.

FIG. 1 shows an apparatus for processing a digital audio signal according to a first embodiment of this invention. The apparatus of FIG. 1 includes a waveform shaping circuit 3 which has an input port 10, an emphasis signal generator 11, a delay circuit 12, an adder 13, and an output port 14. The input port 10 is connected with the emphasis signal generator 11 and the delay circuit 12. The emphasis signal generator 11 and the delay circuit 12 are connected with the adder 13. The adder 13 is connected with the output port 14.

The input port 10 receives, from an external, a first digital audio signal (an input digital audio signal) having a sequence of 24-bit samples which relates to a sampling frequency fs of 48 kHz, 96 kHz, or 192 kHz. For example, the first digital audio signal results from periodically sampling am analog audio signal at a sampling frequency fs of 48 kHz, 96 kHz, or 192 kHz, and converting every resultant analog sample into a digital sample having 24 bits. The first digital audio signal is transmitted via the input port 10 to the emphasis signal generator 11 and the delay circuit 12. The emphasis signal generator 11 produces a corrective digital signal in response to the first digital audio signal. The corrective digital signal has a sequence of 24 bit samples which relates to a sampling frequency equal to that for the first digital audio signal. The corrective digital signal is designed to emphasize high-frequency signal components. The emphasis signal generator 11 outputs the corrective digital signal to the adder 13.

The delay circuit 12 defers the first digital audio signal by a time interval corresponding to a signal delay caused in the emphasis signal generator 11. The delay circuit 12 outputs the resultant digital audio signal to the adder 13 as a second digital audio signal. The device 13 adds the second digital audio signal and the corrective digital signal into a third digital audio signal. The corrective digital signal causes high-frequency components of the third digital audio signal to be emphasized relative to those of the second digital audio signal. The adder 13 feeds the third digital audio signal to the output port 14. The third digital audio signal is transmitted via the output port 14 to an external as an output digital audio signal. The output digital audio signal has a sequence of 24-bit samples which relates to a sampling frequency equal to that for the input digital audio signal.

The emphasis signal generator 11 includes a digital signal processor, a computer, or a similar device having a combination of an interface, a processing section, a ROM, and a RAM. The emphasis signal generator 11 operates in accordance with a control program stored in the ROM. The control program is designed to enable the emphasis signal generator 11 to implement operation steps which will be mentioned later. The emphasis signal generator 11 processes the first digital audio signal on a sample-by-sample basis.

The steps of operation of the emphasis signal generator 11 include the following steps (1)–(6).

(1) The emphasis signal generator 11 compares every sample (the present sample or the sample of interest) of the input digital audio signal with the immediately-preceding sample thereof to generate a comparison result. The comparison result represents whether the signal level represented by the present sample is greater than, smaller than, or equal to that represented by the immediately-preceding sample. A sequence of the comparison results corresponding to the respective samples is generated.

(2) On the basis of the sequence of the comparison results, the emphasis signal generator 11 detects samples of the input digital audio signal which correspond to extreme signal levels, that is, maximal signal levels Vmax and minimal signal levels Vmin. In other words, the emphasis signal generator 11 detects signal-level peaks Vmax and signal-level valleys Vmin represented by the input digital audio signal.

(3) The emphasis signal generator 11 detects the time interval from every signal-level peak Vmax to the following signal-level valley Vmin and also the time interval from every signal-level valley Vmin to the following signal-level peak Vmax. Specifically, the emphasis signal generator 11 detects the number of samples in the time interval from every signal-level peak Vmax to the following signal-level valley Vmin and also the number of samples in the time interval from every signal-level valley Vmin to the following signal-level peak Vmax. The detected number of samples in the time interval from every signal-level peak Vmax to the following signal-level valley Vmin is also referred to as the detected peak-to-valley sample number. The detected number of samples in the time interval from every signal-level valley Vmin to the following signal-level peak Vmax is also referred to as the detected valley-to-peak sample number. According to preferable sample-number definitions, a peak-corresponding sample and a valley-corresponding sample in succession are counted as a peak-to-valley sample number of "1".

(4) The emphasis signal generator 11 calculates the difference Δmax between every maximal signal level and the signal level represented by the sample immediately preceding the peak-corresponding sample. Specifically, the difference Δmax is equal to every maximal signal level minus the signal level represented by the sample immediately preceding the peak-corresponding sample.

Therefore, the sign of the difference Δmax is positive. In addition, the emphasis signal generator 11 calculates the difference Δmin between every minimal signal level and the signal level represented by the sample immediately preceding the valley-corresponding sample. The difference Δmin is equal to every minimal signal level minus the signal level represented by the sample immediately preceding the valley-corresponding sample. Therefore, the sign of the difference Δmin is negative.

(5) The emphasis signal generator 11 calculates a positive coefficient A max from every detected valley-to-peak sample number by referring to a first table indicative of a predetermined relation between the coefficient Amax and the valley-to-peak sample number. Preferably, data representing the first table are stored in the ROM within the emphasis signal generator 11. In addition, the emphasis signal generator 11 calculates a positive coefficient Amin from every detected peak-to-valley sample number by referring to a second table indicative of a predetermined relation between the coefficient A min and the peak-to-valley sample number. Preferably, data representing the second table are stored in the ROM within the emphasis signal generator 11.

(6) The emphasis signal generator 11 multiplies the calculated difference Δmax and the calculated coefficient Amax to generate a multiplication result "Amax·Δmax" for the related signal-level peak. Since both the calculated difference Δmax and the calculated coefficient A max are positive, the multiplication result "Amax·Δmax" is also positive. In addition, the emphasis signal generator 11 multiplies the calculated difference Δmin and the calculated coefficient Δmin to generate a multiplication result "Amin·Δmin" for the related signal-level valley. Since the calculated difference Δmin is negative while the calculated coefficient Δmin is positive, the multiplication result "Amin·Δmin" is negative. The emphasis signal generator 11 outputs the multiplication result "Amax·Δmax" and the multiplication result "Amin·Δmin" as the corrective digital signal.

The adder 13 processes each of peak-corresponding samples and valley-corresponding samples of the second digital audio signal (the output signal from the delay circuit 12) in response to the corrective digital signal fed from the emphasis signal generator 11. Samples of the second digital audio signal except peak-corresponding samples and valley-corresponding samples propagate through the adder 13 and form samples of the third digital audio signal without being changed thereby. Specifically, the adder 13 updates every maximal signal level Vmax by adding the absolute value of a corresponding multiplication result "Amax·Δmax" thereto. In other words, the adder 13 increments every maximal signal level Vmax by the absolute value of a corresponding multiplication result "Amax·Δmax" according to the following relation.

$$Vmax(new) \rightarrow Vmax(old) + |Amax \cdot \Delta max|$$

Also, the adder 13 updates, every minimal signal level Vmin by adding a corresponding multiplication result "Amin·Δmin" thereto.

As previously mentioned, the multiplication result "Amin·Δmin" is negative. Thus, the adder 13 decrements every minimal signal level Vmin by the absolute value of a corresponding multiplication result "Amin·Δmin" according to the following relation.

$$Vmin(new) \rightarrow Vmin(old) - |Amin \cdot \Delta min|$$

The adder 13 outputs the processing-resultant signal as the third digital audio signal. As previously mentioned, the third digital audio signal constitutes the output digital audio signal.

Figure 2:
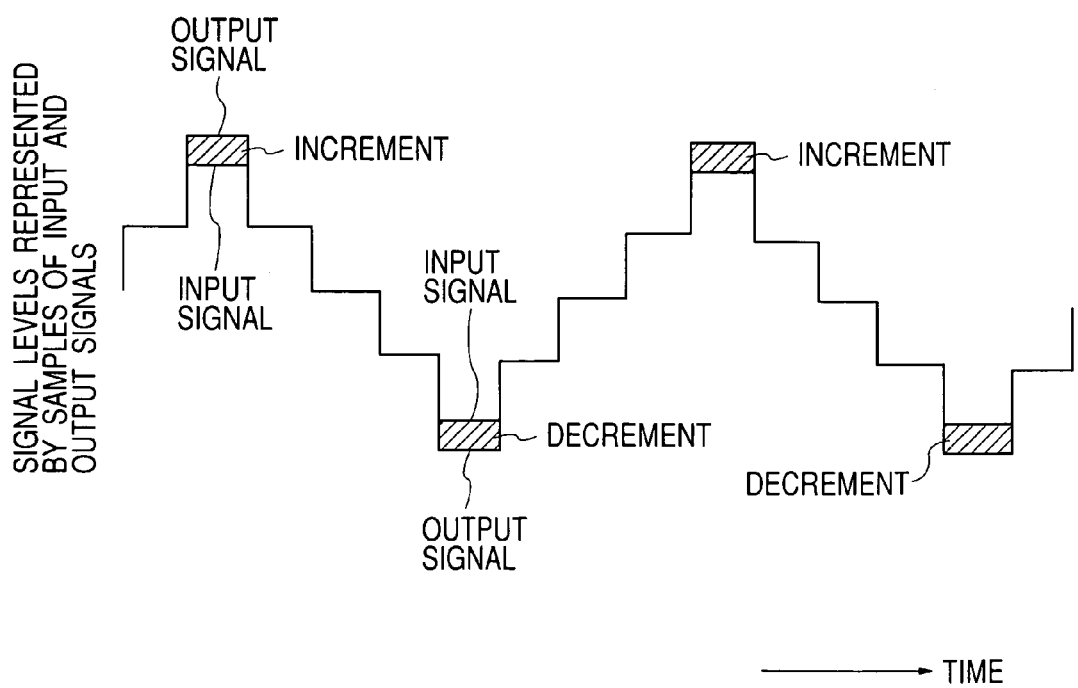
FIG. 2 is a time-domain diagram of an example of the signal levels represented by a sequence of samples of an input digital audio signal and a sequence of samples of an output digital audio signal regarding the apparatus of FIG. 1.

As shown in FIG. 2, maximal signal levels Vmax represented by peak-corresponding samples of the output digital audio signal are increased relative to those of the input digital audio signal (the first digital audio signal). In addition, minimal signal levels Vmin represented by valley-corresponding samples of the output digital audio signal are decreased relative to those of the input digital audio signal (the first digital audio signal). Thus, signal-level peaks and signal-level valleys represented by the output digital audio signal are emphasized relative to those represented by the input digital audio signal. Accordingly, the output digital audio signal is better than the input digital audio signal in tone sharpness, tone reality, and tone clearness.

FIG. 3 shows an example of the contents of the first and second tables. With reference to FIG. 3, the coefficient Δmax is equal to ½ when the valley-to-peak sample number is in the range of 1 to 5. The coefficient Amax is equal to ¼ when the valley-to-peak sample number is in the range of 6 to 9. The coefficient Amax is equal to ⅛ when the valley-to-peak sample number is in the range of 10 to 14. The coefficient Amax is equal to 1/16 when the valley-to-peak sample number is equal to or greater than 15.

Accordingly, the coefficient Δmax decreases stepwise as the valley-to-peak sample number increases. Similarly, the coefficient Amin is equal to ½ when the peak-to-valley sample number is in the range of 1 to 5. The coefficient Amin is equal to ¼ when the peak-to-valley sample number is in the range of 6 to 9. The coefficient Amin is equal to ⅛ when the peak-to-valley sample number is in the range of 10 to 14. The coefficient Amin is equal to 1/16 when the peak-to-valley sample number is equal to or greater than 15. Accordingly, the coefficient Δmin decreases stepwise as the peak-to-valley sample number increases.

Figure 4:
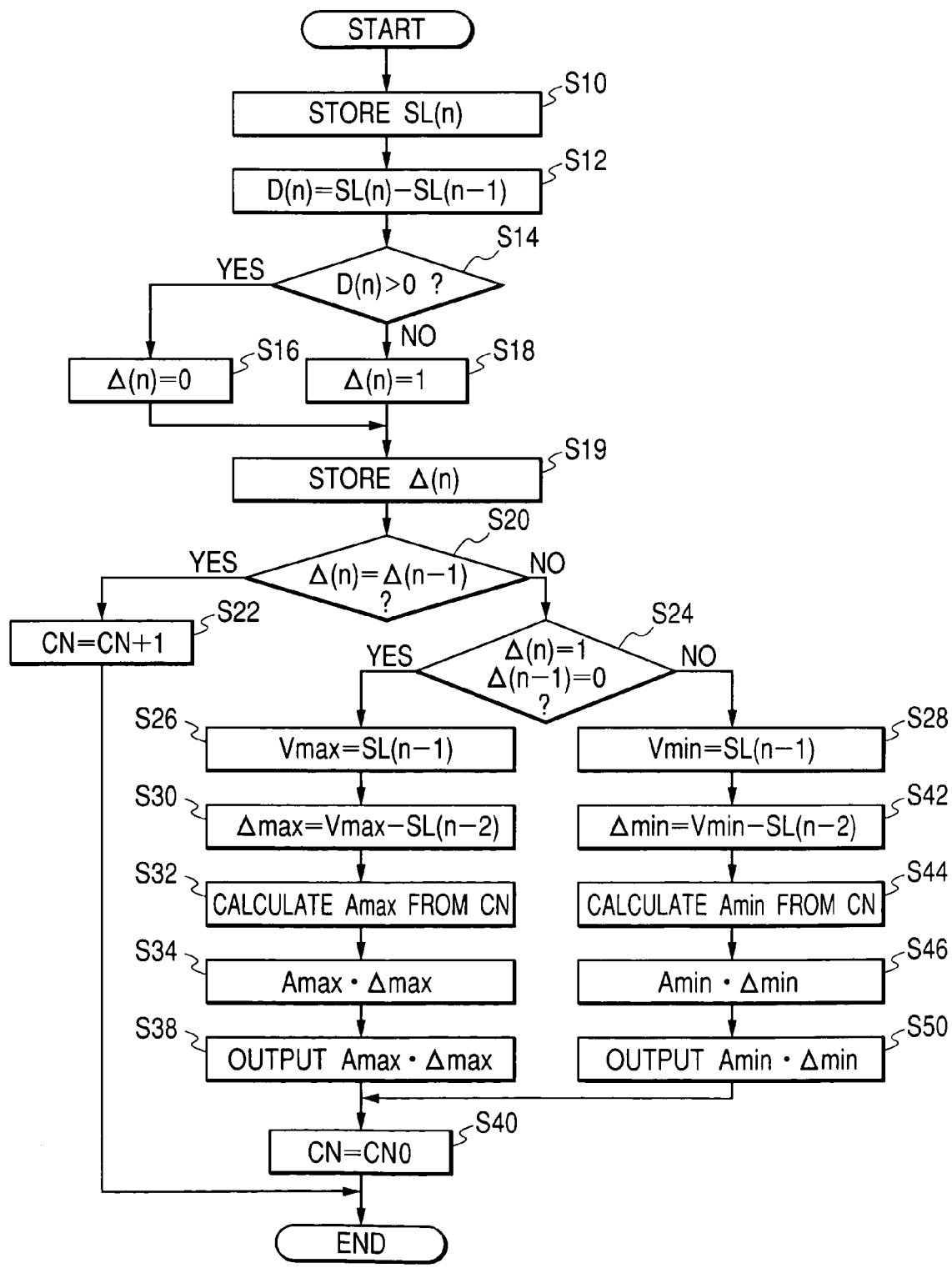
FIG. 4 is a flowchart of a segment of a control program for an emphasis signal generator in FIG. 1.

As previously mentioned, the emphasis signal generator 11 operates in accordance with a control program stored in the ROM therein. FIG. 4 is a flowchart of a segment of the control program.

The program segment in FIG. 4 is executed for every sample of the input digital audio signal (the first digital audio signal). In the program segment of FIG. 4, the sample of interest is the second latest sample rather than the first latest sample.

As shown in FIG. 4, EL first step S10 of the program segment stores the first latest sample SL(n) of the input digital audio signal into the RAM within the emphasis signal generator 11 for later use.

A step S12 following the step S10 retrieves the second latest sample SL(n−1) of the input digital audio signal from the RAM. The step S12 calculates the difference D(n) between the first latest sample SL(n) and the second latest sample SL(n−1) by referring to the equation as "D(n)=SL(n)−SL(n−1)".

A step S14 subsequent to the step S12 decides whether or not the difference D(n) is positive. When the difference D(n) is positive, the program advances from the step S14 to a step S16 which sets a value Δ(n) to "0". When the difference D(n) is not positive, the program advances from the step S14 to a step S18 which sets the value Δ(n) to "1".

A step S19 following the steps S16 and S18 stores the value Δ(n) into the RAM for later use.

A step S20 subsequent to the step S19 retrieves the immediately-preceding value Δ(n−1) from the RAM. The step S20 decides whether or not the present value Δ(n) is equal to the immediately-preceding value Δ(n−1). When the present value Δ(n) is equal to the immediately-preceding value Δ(n−1), the program advances from the step S20 to a step S22. In this case, it is determined that the second latest sample SL(n−1) corresponds to neither a signal-level peak nor a signal-level valley. On the other hand, when the present value Δ(n) is not equal to the immediately-preceding value Δ(n−1), the program advances from the step S20 to a step S24. In this case, it is determined that the second latest sample SL(n−1) corresponds to a signal-level peak or a signal-level valley.

The step S22 increments a count number CN by "1" according to the statement as "CN=CN+1". After the step S22, the current execution cycle of the program segment ends.

The step S24 decides whether or not the present value Δ(n) and the immediately-preceding value Δ(n−1) are equal to "1" and "0" respectively. When the present value Δ(n) and the immediately-preceding value Δ(n−1) are equal to "1" and "0" respectively, the program advances from the step S24 to a step S26. In this case, it is determined that the second latest sample SL(n−1) corresponds to a signal-level peak. On the other hand, when the present value Δ(n) and the immediately-preceding value Δ(n−1) are not equal to "1" and "0" respectively, the program advances from the step S24 to a step S28. In this case, it is determined that the second latest sample SL(n−1) corresponds to a signal-level valley.

The step S26 sets a value Vmax to the value represented by the second latest sample SL(n−1). The value Vmax is an indication of a signal-level peak.

A step S30 following the step S26 retrieves the third latest sample SL(n−2) of the input digital audio signal from the RAM. The step S30 calculates a difference Δmax which is equal to the signal-level peak Vmax minus the value represented by the third latest sample SL(n−2). That is, Δmax=Vmax−SL(n−2).

A step S32 subsequent to the step S30 calculates a positive coefficient Amax from the count number CN by referring to a first table indicative of a predetermined relation between the coefficient Amax and the count number CN. Data representing the first table are stored in the ROM within the emphasis signal generator 11.

A step S34 following the step S32 multiplies the calculated difference Δmax and the calculated coefficient Amax to generate a multiplication result "Amax·Δmax".

A step S38 subsequent to the step S34 outputs the multiplication result "Amax·Δmax" to the adder 13 (see FIG. 1) as the corrective digital signal for the related peak-corresponding sample of the input digital audio signal. After the step S38, the program advances to a step S40.

The step S28 sets a value Vmin to the value represented by the second latest sample SL(n−1). The value Vmin is an indication of a signal-level valley.

A step S42 following the step S28 retrieves the third latest sample SL(n−2) of the input digital audio signal from the RAM. The step S42 calculates a difference Δmin which is equal to the signal-level valley Vmin minus the value represented by the third latest sample SL(n−2). That is, Δmin=Vmin−SL(n−2).

A step S44 subsequent to the step S42 calculates a positive coefficient Amin from the count number CN by referring to a second table indicative of a predetermined relation between the coefficient Amin and the count number CN. Data representing the second table are stored in the ROM within the emphasis signal generator 11.

A step S46 following the step S44 multiplies the calculated difference Δmin and the calculated coefficient Amin to generate a multiplication result "Amin·Δmin".

A step S50 subsequent to the step S46 outputs the multiplication result "Amin·Δmin" to the adder 13 (see FIG. 1) as the corrective digital signal for the related valley-corresponding sample of the input digital audio signal. After the step S50, the program advances to the step S40.

The step S40 resets the count number CN to a predetermined initial value CN0. The initial value CN0 is equal to "1" under the sample-number definitions where a peak-corresponding sample and a valley-corresponding sample in succession are counted as a peak-valley sample number of "1". After the step S40, the current execution cycle of the program segment ends.

Second Embodiment

Figure 5:
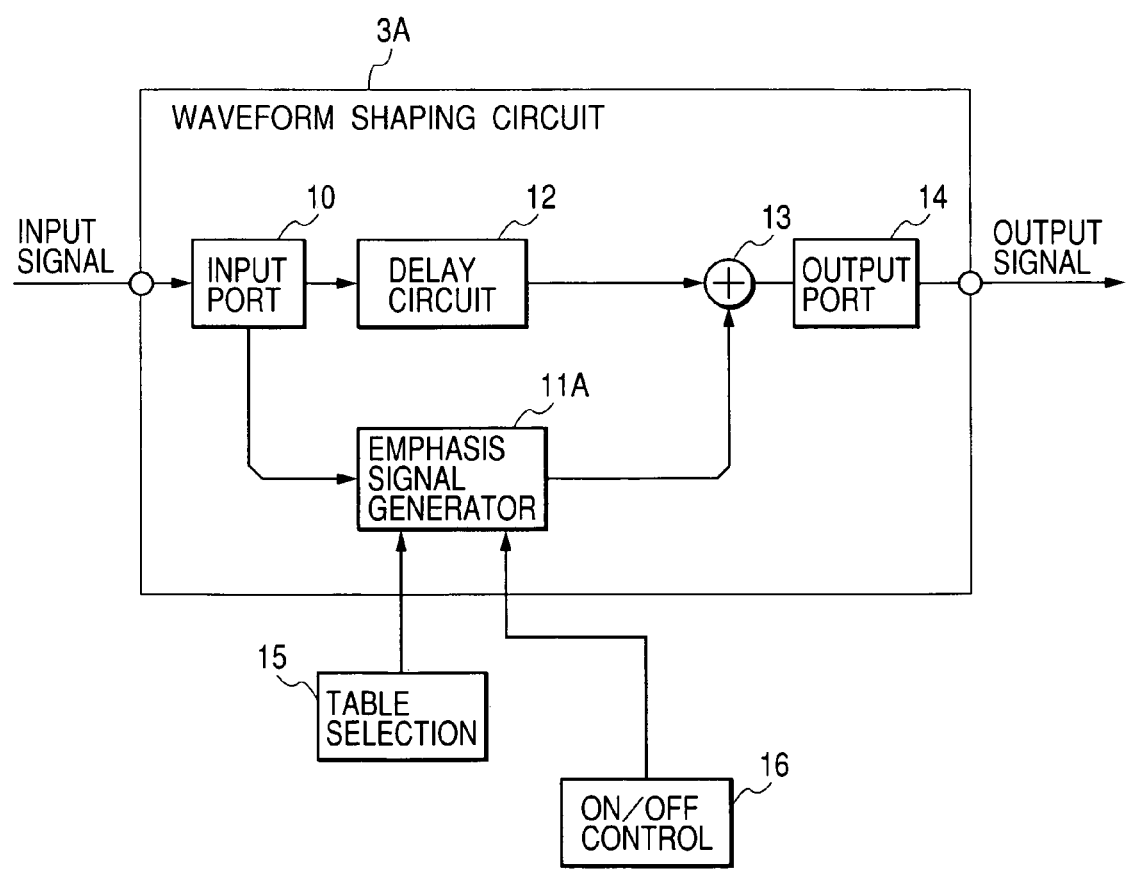
FIG. 5 is a block diagram of an apparatus for processing a digital audio signal according to a second embodiment of this invention.

FIG. 5 shows an apparatus for processing a digital audio signal according to a second embodiment of this invention. The apparatus of FIG. 5 is similar to the apparatus of FIG. 1 except for additional arrangements mentioned hereafter.

The apparatus of FIG. 5 includes an emphasis signal generator 11A instead of the emphasis signal generator 11 (see FIG. 1). The apparatus of FIG. 5 includes a table selection switch 15 and an ON/OFF control switch 16 connected with the emphasis signal generator 11A.

A ROM in the emphasis signal generator 11A stores data representing first, second, third, and fourth tables. The first table indicates a predetermined relation between a coefficient Amax1 and the valley-to-peak sample number. The second table indicates a predetermined relation between a coefficient Amin1 and the peak-to-valley sample number. The third table indicates a predetermined relation between a coefficient Amax2 and the valley-to-peak sample number. The fourth table indicates a predetermined relation between a coefficient Amin2 and the peak-to-valley sample number. The ROM in the emphasis signal generator 11A may store data representing fifth and subsequent tables.

The table selection switch 15 can be changed between a first position and a second position in response to user's request. The table selection switch 15 outputs a signal to the emphasis signal generator 11A which represents whether the table selection switch is in its first position or its second position. The emphasis signal generator 11A responds to the output signal from the table selection switch 15. Specifically, the emphasis signal generator 11A selects the first table and the second table when the output signal from the table selection switch 15 represents that the table selection switch is in its first position. In this case, the emphasis signal generator 11A calculates the coefficient Amax1 from the valley-to-peak sample number by referring to the first table, and uses the calculated coefficient Amax1 as the coefficient Amax. In addition, the emphasis signal generator 11A calculates the coefficient Amin1 from the peak-to-valley sample number by referring to the second table, and uses the calculated coefficient Amin1 as the coefficient Amin. The emphasis signal generator 11A selects the third table and the fourth table when the output signal from the table selection switch 15 represents that the table selection switch 15 is in its second position. In this case, the emphasis signal generator 11A calculates the coefficient Amax2 from the valley-to-peak sample number by referring to the third table, and uses the calculated coefficient Amax2 as the coefficient Amax. In addition, the emphasis signal generator 11A calculates the coefficient Amin2 from the peak-to-valley sample number by referring to the fourth table, and uses the calculated coefficient Amin2 as the coefficient Amin.

FIG. 6 shows an example of the contents of the first, second, third, and fourth tables. With reference to FIG. 6, the coefficient Amax1 is equal to ½ when the valley-to-peak sample number is in the range of 1 to 5. The coefficient Amax1 is equal to ¼ when the valley-to-peak sample number is in the range of 6 to 9. The coefficient Amax1 is equal to ⅛ when the valley-to-peak sample number is in the range of 10 to 14. The coefficient Amax1 is equal to 1/16 when the valley-to-peak sample number is equal to or greater than 15. Accordingly, the coefficient Amax1 decreases stepwise as the valley-to-peak sample number increases. Similarly, the coefficient Amin1 is equal to ½ when the peak-to-valley sample number is in the range of 1 to 5. The coefficient Amin1 is equal to ¼ when the peak-to-valley sample number is in the range of 6 to 9. The coefficient Amin1 is equal to ⅛ when the peak-to-valley sample number is in the range of 10 to 14. The coefficient Amin1 is equal to ¹⁄₁₆ when the peak-to-valley sample number is equal to or greater than 15. Accordingly, the coefficient Amin1 decreases stepwise as the peak-to-valley sample number increases. The coefficient Amax2 is equal to ¼ when the valley-to-peak sample number is in the range of 1 to 5. The coefficient Amax2 is equal to ⅛ when the valley-to-peak sample number is in the range of 6 to 9. The coefficient Amax2 is equal to ¹⁄₁₆ when the valley-to-peak sample number is in the range of 10 to 14. The coefficient Amax2 is equal to ¹⁄₃₂ when the valley-to-peak sample number is equal to or greater than 15. Accordingly, the coefficient Amax2 decreases stepwise as the valley-to-peak sample number increases.

Similarly, the coefficient Amin2 is equal to ¼ when the peak-to-valley sample number is in the range of 1 to 5. The coefficient Amin2 is equal to ⅛ when the peak-to-valley sample number is in the range of 6 to 9. The coefficient Amin2 is equal to ¹⁄₁₆ when the peak-to-valley sample number is in the range of 10 to 14. The coefficient Amin2 is equal to ¹⁄₃₂ when the peak-to-valley sample number is equal to or greater than 15. Accordingly, the coefficient Amin2 decreases stepwise as the peak-to-valley sample number increases.

Preferably, the table selection switch 15 is changed to select either a pair of the first and second tables or a pair of the third and fourth tables in accordance with the genre of a tune represented by the input digital audio signal.

The ON/OFF control switch 16 can be changed between a first position and a second position in response to user's request. The ON/OFF control switch 16 outputs a signal to the emphasis signal generator 1 1A which represents whether the ON/OFF control switch 16 is in its first position or its second position. The emphasis signal generator 11A responds to the output signal from the ON/OFF control switch 16. Specifically, the emphasis signal generator 11A is disabled when the output signal from the ON/OFF control switch 16 represents that the ON/OFF control switch 16 is in its first position. In this case, the emphasis signal generator 11A fails to output the corrective digital signal to the adder 13. The emphasis signal generator 11A is active when the output signal from the ON/OFF control switch 16 represents that the ON/OFF control switch 16 is in its second position. In this case, the emphasis signal generator 11A operates normally.

Third Embodiment

Figure 7:
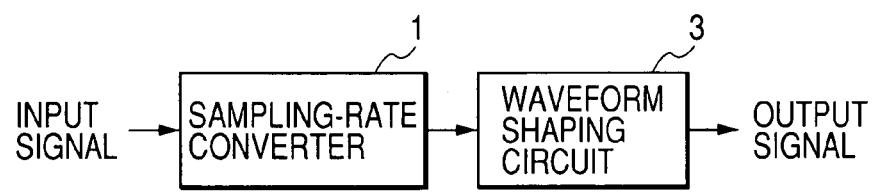
FIG. 7 is a block diagram of an apparatus for processing a digital audio signal according to a third embodiment of this invention.

FIG. 7 shows an apparatus for processing a digital audio signal according to a third embodiment of this invention. The apparatus of FIG. 7 is similar to the apparatus of FIG. 1 except for an additional arrangement mentioned hereafter.

The apparatus of FIG. 7 includes a sampling-rate converter 1 which precedes the waveform shaping circuit 3. The sampling-rate converter 1 receives an input digital audio signal from an external. The sampling-rate converter 1 over-samples the input digital audio signal at a frequency equal to twice the sampling frequency related to the input digital audio signal. The sampling-rate converter 1 outputs the resultant digital audio signal to the waveform shaping circuit 3. The waveform shaping circuit 3 processes the output signal from the sampling-rate converter 1. The sampling-rate converter 1 suppresses the aliasing distortion caused in the waveform shaping circuit 3.

Fourth Embodiment

Figure 8:
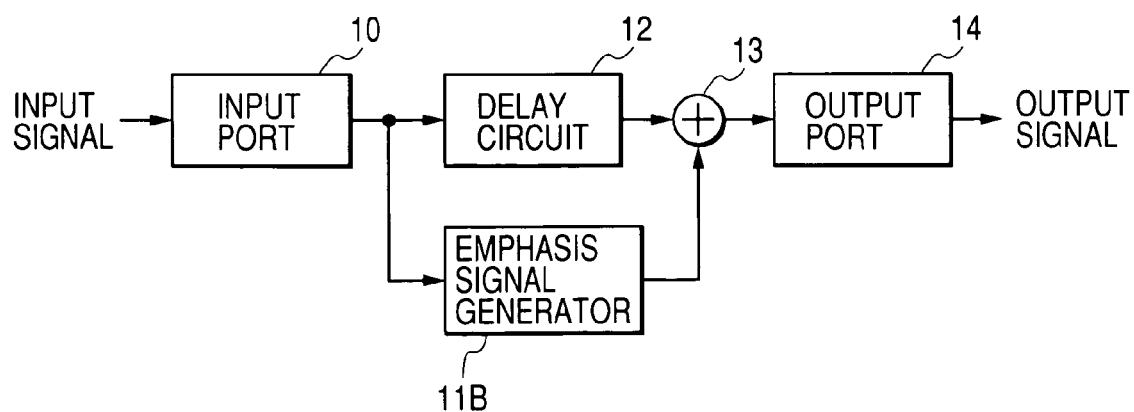
FIG. 8 is a block diagram of an apparatus for processing a digital audio signal according to a fourth embodiment of this invention.

FIG. 8 shows an apparatus for processing a digital audio signal according to a fourth embodiment of this invention. The apparatus of FIG. 8 is similar to the apparatus of FIG. 1 except for a design change mentioned hereafter.

The apparatus of FIG. 8 includes an emphasis signal generator 11B instead of the emphasis signal generator 11 (see FIG. 1). Steps of operation of the emphasis signal generator 11B include the following steps (1)–(6).

(1) The emphasis signal generator 11B compares every sample (the present sample or the sample of interest) of the input digital audio signal with the immediately-preceding sample thereof to generate a comparison result. The comparison result represents whether the signal level represented by the present sample is greater than, smaller than, or equal to that represented by the immediately-preceding sample. A sequence of the comparison results corresponding to the respective samples is generated.

(2) On the basis of the sequence of the comparison results, the emphasis signal generator 11B detects samples of the input digital audio signal which correspond to extreme signal levels, that is, maximal signal levels Vmax and minimal signal levels Vmin. In other words, the emphasis signal generator 11B detects signal-level peaks Vmax and signal-level valleys Vmin represented by the input digital audio signal.

(3) The emphasis signal generator 11B detects the time interval from every signal-level peak Vmax to the following signal-level valley Vmin and also the time interval from every signal-level valley Vmin to the following signal-level peak Vmax. Specifically, the emphasis signal generator 11B detects the number of samples in the time interval from every signal-level peak Vmax to the following signal-level valley Vmin and also the number of samples in the time interval from every signal-level valley Vmin to the following signal-level peak Vmax. The detected number of samples in the time interval from every signal-level peak Vmax to the following signal-level valley Vmin is also referred to as the detected peak-to-valley sample number. The detected number of samples in the time interval from every signal-level valley Vmin to the following signal-level peak Vmax is also referred to as the detected valley-to-peak sample number.

(4) The emphasis signal generator 11B calculates the difference "Δ" between every maximal signal level and the signal level represented by the sample immediately preceding the peak-corresponding sample, or the difference "Δ" between every minimal signal level and the signal level represented by the sample immediately preceding the valley-corresponding sample.

(5) The emphasis signal generator 11B calculates a positive coefficient "α" from every detected valley-to-peak or peak-to-valley sample number by referring to one of tables each indicative of a predetermined relation between the coefficient "α" and the valley-to-peak or peak-to-valley sample number. Preferably, data representing the tables are stored in a ROM within the emphasis signal generator 11B.

(6) The emphasis signal generator 11B multiplies the calculated difference "Δ" and the calculated coefficient "α" to generate a multiplication result "α·Δ". The emphasis signal generator 11B outputs the multiplication result "α·Δ" to the adder 13 as the corrective digital signal for one of the related peak-corresponding sample, the related valley-corresponding sample, the samples temporally near (neighboring) the peak-corresponding sample, and the samples temporally near (neighboring) the valley-corresponding sample.

The adder 13 processes each of peak-corresponding samples and valley-corresponding samples of the second digital audio signal (the output signal from the delay circuit 12) in response to the corrective digital signal fed from the emphasis signal generator 11B. Specifically, the adder 13 updates every maximal signal level Vmax by adding the absolute value of a corresponding multiplication result "α·Δ" thereto. For every peak-corresponding sample, the coefficient "α" is chosen so that the multiplication result "α·Δ" will be equal to the multiplication result "Amax·Δmax". Thus, the adder 13 increments every maximal signal level Vmax by the absolute value of a corresponding multiplication result "α·Δ" according to the following relation.

Vmax(new)→Vmax(old)+|α·Δ|

Also, the adder 13 updates every minimal signal level Vmin by subtracting the absolute value of a corresponding multiplication result "α·Δ" therefrom. For every valley-corresponding sample, the coefficient "α" is chosen so that the multiplication result "α·Δ" will be equal to the multiplication result "Amin·Δmin". Thus, the adder 13 decrements every minimal signal level Vmin by the absolute value of a corresponding multiplication result "α·Δ" according to the following relation.

Vmin(new)→Vmin(old)−|α·Δ|

The adder 13 processes each of samples of the second digital audio signal (the output signal from the delay circuit 12) temporally near or temporally neighboring peak-corresponding samples and valley-corresponding samples thereof in response to the corrective digital signal fed from the emphasis signal generator 11B.

Specifically, the adder 13 updates the signal level V, which is represented by every sample temporally near (neighboring) a peak-corresponding sample, by adding the absolute value of a corresponding multiplication result "α·Δ" thereto. In other words, the adder 13 increments the signal level V by the absolute value of a corresponding multiplication result "α·Δ" according to the following relation.

V(new)→V(old)+|α·Δ|

Also, the adder 13 updates the signal level V, which is represented by every sample temporally near (neighboring) a valley-corresponding sample, by subtracting the absolute value of a corresponding multiplication result "α·Δ" therefrom. In other words, the adder 13 decrements the signal level V by the absolute value of a corresponding multiplication result "α·Δ" according to the following relation.

V(new)→V(old)−|α·Δ|

The adder 13 outputs the processing-resultant signal as the third digital audio signal. As previously mentioned, the third digital audio signal constitutes the output digital audio signal.

FIG. 9 shows an example of the contents of the tables for the coefficient "α" used in correcting samples of the second digital audio signal (the output signal from the delay circuit 12) temporally near or temporally neighboring peak-corresponding samples and valley-corresponding samples thereof. There are coefficients α0,0, α0,1, α1,0, and α1,1, one of which is selected as the coefficient "α" in accordance with user's request. With reference to FIG. 9, the coefficient α0,0 is equal to ½ when the valley-to-peak or peak-to-valley sample number is in the range of 2 to 3. The coefficient α0,0 is equal to ¼ when the valley-to-peak or peak-to-valley sample number is in the range of 4 to 5. The coefficient α0,0 is equal to ⅛ when the valley-to-peak or peak-to-valley sample number is in the range of 6 to 7. The coefficient α0,0 is equal to ¹⁄₁₆ when the valley-to-peak sample number is equal to 8. Accordingly, the coefficient α0,0 decreases stepwise as the valley-to-peak or peak-to-valley sample number increases. The coefficient α0,1 is equal to ¼ when the valley-to-peak or peak-to-valley sample number is in the range of 2 to 3. The coefficient α0,1 is equal to ⅛ when the valley-to-peak or peak-to-valley sample number is in the range of 4 to 5. The coefficient α0,1 is equal to ¹⁄₁₆ when the valley-to-peak or peak-to-valley sample number is in the range of 6 to 7. The coefficient α0,1 is equal to ¹⁄₃₂ when the valley-to-peak sample number is equal to 8. Accordingly, the coefficient α0,1 decreases stepwise as the valley-to-peak or peak-to-valley sample number increases. The coefficient α1,0 is equal to ⅛ when the valley-to-peak or peak-to-valley sample number is in the range of 2 to 3. The coefficient α1,0 is equal to ¹⁄₁₆ when the valley-to-peak or peak-to-valley sample number is in the range of 4 to 5. The coefficient α1,0 is equal to ¹⁄₃₂ when the valley-to-peak or peak-to-valley sample number is in the range of 6 to 7. The coefficient α1,0 is equal to ¹⁄₆₄ when the valley-to-peak sample number is equal to 8. Accordingly, the coefficient α1,0 decreases stepwise as the valley-to-peak or peak-to-valley sample number increases. The coefficient α1,1 is equal to ¹⁄₁₆ when the valley-to-peak or peak-to-valley sample number is in the range of 2 to 3. The coefficient α1,1 is equal to ¹⁄₃₂ when the valley-to-peak or peak-to-valley sample number is in the range of 4 to 5. The coefficient α1,1 is equal to ¹⁄₆₄ when the valley-to-peak or peak-to-valley sample number is in the range of 6 to 7. The coefficient α1,1 is equal to ¹⁄₁₂₈ when the valley-to-peak sample number is equal to 8. Accordingly, the coefficient α1,1 decreases stepwise as the valley-to-peak or peak-to-valley sample number increases.

Figure 10:
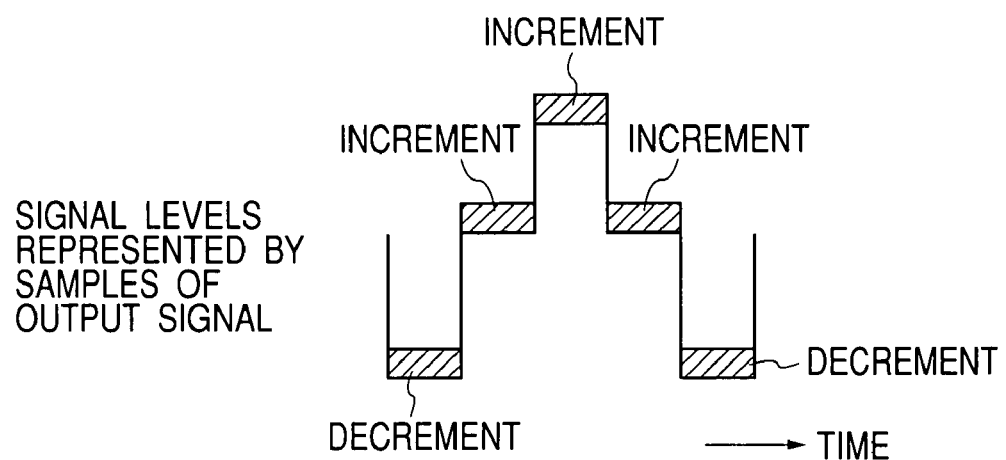
FIG. 10 is a time-domain diagram of a first example of the signal level represented by a sequence of samples of an output digital audio signal regarding the apparatus of FIG. 8.

FIG. 10 shows the signal levels represented by successive samples of the output digital audio signal which include a sequence of a first valley-corresponding sample, a first intermediate sample, a peak-corresponding sample, a second intermediate sample, and a second valley-corresponding sample. As shown in FIG. 10, the first and second valley-corresponding samples of the output digital audio signal are decremented from the original samples. The peak-corresponding sample of the output digital audio signal is incremented from the original sample. The emphasis signal generator 11B is designed so that the first and second intermediate samples of the output digital audio signal will be incremented rather than being decremented.

Figure 11:
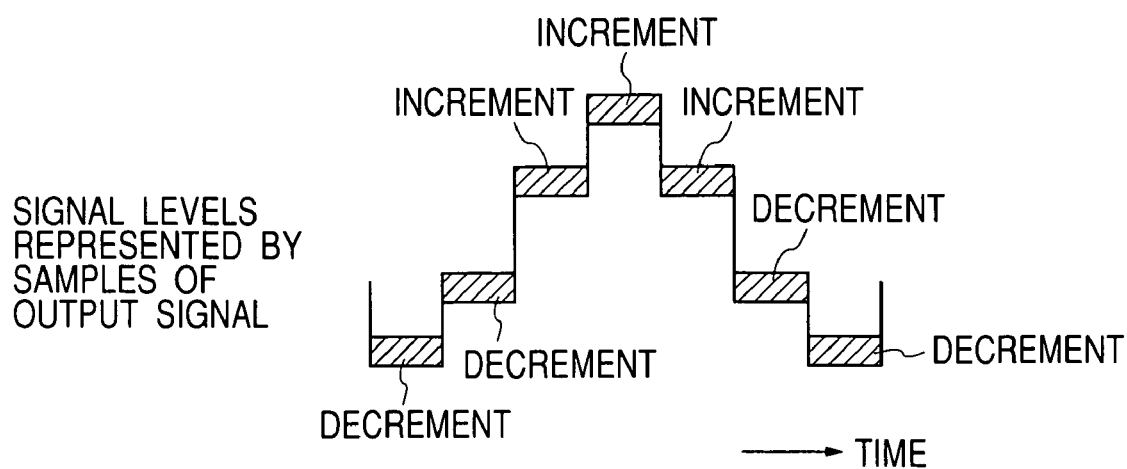
FIG. 11 is a time-domain diagram of a second example of the signal level represented by a sequence of samples of the output digital audio signal regarding the apparatus of FIG. 8.

FIG. 11 shows the signal levels represented by successive samples of the output digital audio signal which include a sequence of a first valley-corresponding sample, a first intermediate sample, a second intermediate sample, a peak-corresponding sample, a third intermediate sample, a fourth intermediate sample, and a second valley-corresponding sample. As shown in FIG. 11, the first and second valley-corresponding samples of the output digital audio signal are decremented from the original samples. The peak-corresponding sample of the output digital audio signal is incremented from the original sample. The second and third intermediate samples of the output digital audio signal which temporally neighbor the peak-corresponding sample thereof are incremented from the original samples. The first and fourth intermediate samples of the output digital audio signal which temporally neighbor the first and second valley-corresponding samples thereof are decremented from the original samples.

Fifth Embodiment

Figure 12:
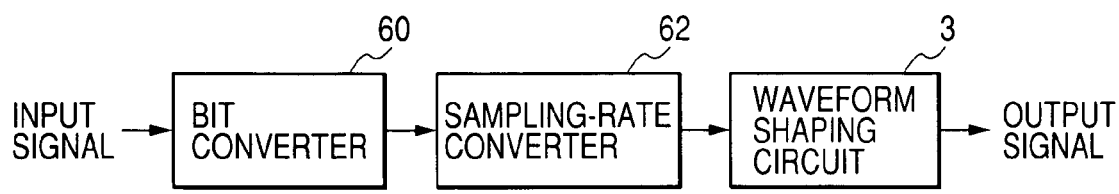
FIG. 12 is a block diagram of an apparatus for processing a digital audio signal according to a fifth embodiment of this invention.

FIG. 12 shows an apparatus for processing a digital audio signal according to a fifth embodiment of this invention. The apparatus of FIG. 12 is similar to the apparatus of FIG. 1 except for additional arrangements mentioned hereafter.

The apparatus of FIG. 12 includes a bit converter 60 and a sampling-rate converter 62. The bit converter 60 is followed by the sampling-rate converter 62. The sampling-rate converter 62 is followed by the waveform shaping circuit 3.

The bit converter 60 receives, from an external, a first digital audio signal (an input digital audio signal) having a sequence of 16-bit samples which relates to a sampling frequency of 44.1 kHz. The bit converter 60 changes every 16-bit sample of the input digital audio signal into a corresponding 24-bit sample. Thus, the first digital audio signal is converted into a second digital audio signal having a sequence of 24-bit samples which relates to a sampling frequency of 44.1 kHz. The bit converter 60 outputs the second digital audio signal to the sampling-rate converter 62. The sampling-rate converter 62 over-samples the second digital audio signal, thereby generating a third digital audio signal having a sequence of 24-bit samples which relates to a sampling frequency of 48 kHz, 96 kHz, or 192 kHz. The sampling-rate converter 62 outputs the third digital audio signal to the waveform shaping circuit 3. The waveform shaping circuit 3 processes the output signal from the sampling-rate converter 62.

Sixth Embodiment

Figure 13:
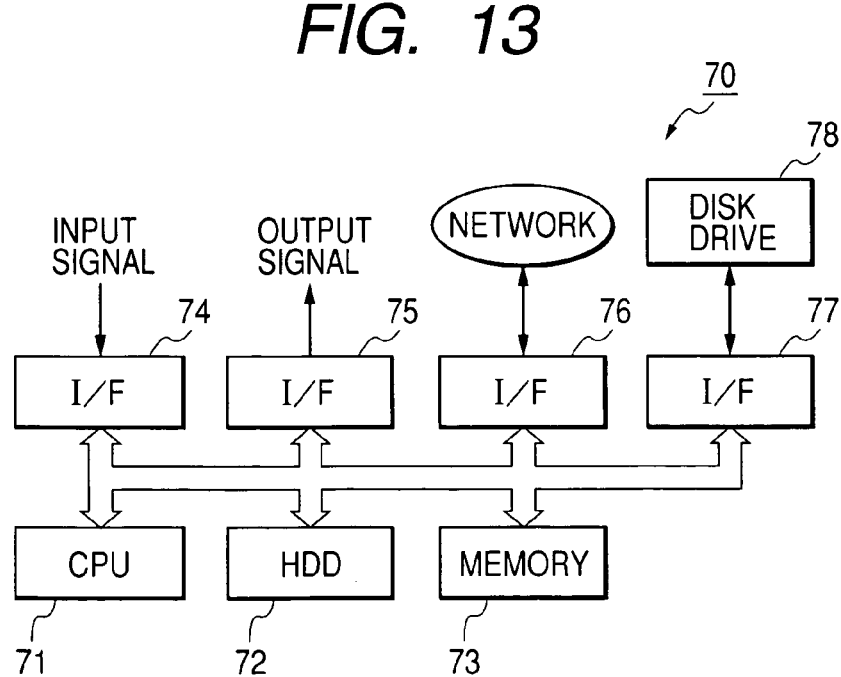
FIG. 13 is a block diagram of an apparatus for processing a digital audio signal according to a sixth embodiment of this invention.

FIG. 13 shows an apparatus for processing a digital audio signal according to a sixth embodiment of this invention. The apparatus of FIG. 13 includes a computer 70 of, for example, a personal type.

The computer 70 includes a CPU 71, a hard disk drive 72, a memory 73, interfaces 74, 75, 76, and 77 which are connected by a bus. The computer 70 includes a removable-disc drive 78 connected with the interface 77. The removable-disk drive 78 uses, for example, an optical disk drive, a magneto-optical disk drive, or a floppy disk drive. The interface 76 is connected with a communication network such as the Internet.

The interface 74 receives, from an external, an input digital audio signal having a sequence of 24-bit samples which relates to a sampling frequency fs of 48 kHz, 96 kHz, or 192 kHz. For example, the input digital audio signal results from periodically sampling an analog audio signal at a sampling frequency fs of 48 kHz, 96 kHz, or 192 kHz, and converting every resultant analog sample into a digital sample having 24 bits. The input digital audio signal is transmitted via the interface 74 to the CPU 71.

The interface 76 may receive the input digital audio signal from the communication network. In this case, the input digital audio signal is transmitted via the interface 76 to the CPU 71.

The interface 77 may receive the input digital audio signal from the removable-disk drive 78. In this case, the input digital audio signal is reproduced from a removable recording disk in the removable-disk drive 78, and is transmitted via the interface 77 to the CPU 71.

The CPU 71 processes the input digital audio signal into an output digital audio signal on a sample-by-sample basis. The CPU 71 feeds the output digital audio signal to the interface 75. The output digital audio signal is transmitted via the interface 75 to an external.

The CPU 71 operates in accordance with a control program (a computer program) stored in the hard disk drive 72 or the memory 73. The control program can be downloaded into the hard disk drive 72 or the memory 73 via the communication network and the interface 76. The control program can be transmitted from a removable recording disk into the hard disk drive 72 or the memory 73 via the removable-disk drive 78 and the interface 77. The control program contain data representing a first table indicative of a predetermined relation between a coefficient Amax and a count number CN. In addition, the control program contain data representing a second table indicative of a predetermined relation between a coefficient Amin and a count number CN. The first and second tables are similar to those in the first embodiment of this invention.

FIG. 14 is a flowchart of a segment of the control program. The program segment in FIG. 14 is executed for every sample of the input digital audio signal. In the program segment of FIG. 14, the sample of interest is the second latest sample rather than the first latest sample.

As shown in FIG. 14, a first step S110 of the program segment stores the first latest sample SL(n) of the input digital audio signal into the memory 73 for later use.

A step S112 following the step S110 retrieves the second latest sample SL(n−1) of the input digital audio signal from the memory 73. The step S112 calculates the difference D(n) between the first latest sample SL(n) and the second latest sample SL(n−1) by referring to the equation as "D(n)=SL(n)−SL(n−1)".

A step S114 subsequent to the step S112 decides whether or not the difference D(n) is positive. When the difference D(n) is positive, the program advances from the step SI 14 to a step S116 which sets a value Δ(n) to "0". When the difference D(n) is not positive, the program advances from the step S114 to a step S118 which sets the value Δ(n) to "1".

A step S119 following the steps S116 and S118 stores the value Δ(n) into the memory 73 for later use.

A step S120 subsequent to the step S119 retrieves the immediately-preceding value Δ(n−1) from the memory 73. The step S120 decides whether or not the present value Δ(n) is equal to the immediately-preceding value Δ(n−1). When the present value Δ(n) is equal to the immediately-preceding value Δ(n−1), the program advances from the step S120 to a step S122. In this case, it is determined that the second latest sample SL(n−1) corresponds to neither a signal-level peak nor a signal-level valley. On the other hand, when the present value Δ(n) is not equal to the immediately-preceding value Δ(n−1), the program advances from the step S120 to a step S124. In this case, it is determined that the second latest sample SL(n−1) corresponds to a signal-level peak or a signal-level valley.

The step S122 increments a count number CN by "1" according to the statement as "CN=CN+1".

A step S123 following the step S122 outputs the second latest sample SL(n−1) to the interface 75 as a corresponding sample of the output digital audio signal. After the step S123, the current execution cycle of the program segment ends.

The step S124 decides whether or not the present value Δ(n) and the immediately-preceding value Δ(n−1) are equal to "1" and "0" respectively. When the present value Δ(n) and the immediately-preceding value Δ(n−1) are equal to "1"

and "0" respectively, the program advances from the step S124 to a step S126. In this case, it is determined that the second latest sample SL(n−1) corresponds to a signal-level peak. On the other hand, when the present value Δ(n) and the immediately-preceding value Δ(n−1) are not equal to "1" and "0" respectively, the program advances from the step S124 to a step S128. In this case, it is determined that the second latest sample SL(n−1) corresponds, to a signal-level valley.

The step S126 sets a value Vmax to the value represented by the second latest sample SL(n−1). The value Vmax is an indication of a signal-level peak.

A step S130 following the step S126 retrieves the third latest sample SL(n−2) of the input digital audio signal from the memory 73. The step S130 calculates a difference Δmax which is equal to the signal-level peak Vmax minus the value represented by the third latest sample SL(n−2). That is, Δmax=Vmax−SL(n−2).

A step S132 subsequent to the step S130 calculates a positive coefficient Amax from the count number CN by referring to the first table indicative of the predetermined relation between the coefficient Amax and the count number CN.

A step S134 following the step S132 multiplies the calculated difference Δmax and the calculated coefficient Amax to generate a multiplication result "Amax·Δmax".

A step S136 subsequent to the step S134 updates the signal-level peak Vmax by adding the absolute value of the multiplication result "Amax·Δmax" thereto. In other words, the step S136 increments the signal-level peak Vmax by the absolute value of the multiplication result "Amax·Δmax" according to the following relation.

Vmax(new)→Vmax(old)+|Amax·Δmax|

Thus, the step S136 increments the value of the second latest sample SL(n−1) by the absolute value of the multiplication result "Amax·Δmax".

A step S138 following the step S136 outputs the updating-resultant signal-level peak Vmax, that is, the incrementing-resultant second latest sample SL(n−1), to the interface 75 as a corresponding sample of the output digital audio signal. After the step S138, the program advances to a step S140.

The step S128 sets a value Vmin to the value represented by the second latest sample SL,(n−1). The value Vmin is an indication of a signal-level valley.

A step S142 following the step S128 retrieves the third latest sample SL(n−2) of the input digital audio signal from the memory 73. The step S142 calculates a difference Δmin which is equal to the signal-level valley Vmin minus the value represented by the third latest sample SL(n−2). That is, Δmin=min−SL(n−2).

A step S144 subsequent to the step S142 calculates a positive coefficient A min from the count number CN by referring to the second table indicative of the predetermined relation between the coefficient A min and the count number CN.

A step S146 following the step S144 multiplies the calculated difference Δmin and the calculated coefficient Δmin to generate a multiplication result "Amin·Δmin".

A step S148 subsequent to the step S146 updates the signal-level valley Vmin by subtracting the absolute value of the multiplication result "Amin·Δmin" therefrom. In other words, the step S148 decrements the signal-level valley Vmin by the absolute value of the multiplication result "Amin·Δmin" according to the following relation.

Vmin(new)→Vmin(old)−|Amin·Δmin|

Thus, the step S148 decrements the value of the second latest sample SL(n−1) by the absolute value of the multiplication result "Amin·Δmin".

A step S150 following the step S148 outputs the updating-resultant signal-level valley Vmin, that is, the decrementing-resultant second latest sample SL(n−1), to the interface 75 as a corresponding sample of the output digital audio signal. After the step S150, the program advances to the step S140.

The step S140 resets the count number CN to a predetermined initial value CN0. The initial value CN0 is equal to "1" under the sample-number definitions where a peak-corresponding sample and a valley-corresponding sample in succession are counted as a peak-valley sample number of "1". After the step S140, the current execution cycle of the program segment ends.

What is claimed is:

1. An apparatus for processing a digital audio signal having a sequence of samples, the apparatus comprising:
   first means for detecting maximal values and minimal values represented by samples of the digital audio signal;
   second means for detecting a number of samples from a sample representing a minimal value detected by the first means to a maximal-value-corresponding sample representing a maximal value detected by the first means;
   third means for detecting a number of samples from a sample representing a maximal value detected by the first means to a minimal-value-corresponding sample representing a minimal value detected by the first means;
   fourth means for calculating a first difference between the maximal value represented by the maximal-value-corresponding sample and a value represented by a sample immediately preceding the maximal-value-corresponding sample;
   fifth means for calculating a second difference between the minimal value represented by the minimal-value-corresponding sample and a value represented by a sample immediately preceding the minimal-value-corresponding sample;
   sixth means for calculating a first coefficient from the sample number detected by the second means;
   seventh means for calculating a second coefficient from the sample number detected by the third means;
   eighth means for multiplying the first coefficient and the first difference to generate a first multiplication result;
   ninth means for multiplying the second coefficient and the second difference to generate a second multiplication result;
   tenth means for incrementing the maximal value, represented by the maximal-value-corresponding sample, by the first multiplication result to modify the maximal-value-corresponding sample; and
   eleventh means for decrementing the minimal value, represented by the minimal-value-corresponding sample, by the second multiplication result to modify the minimal-value corresponding sample.

2. An apparatus as recited in claim 1, further comprising:
   twelfth means for calculating a third coefficient from the sample number detected by the second means;
   thirteenth means for calculating a fourth coefficient from the sample number detected by the third means;
   fourteenth means for multiplying the third coefficient and the first difference to generate a third multiplication result;

fifteenth means for multiplying the fourth coefficient and the second difference to generate a fourth multiplication result;

sixteenth means for incrementing a value of a sample near the maximal-value-corresponding sample by the third multiplication result to modify the sample near the maximal-value-corresponding sample; and seventeenth means for decrementing a value of a sample near the minimal-value-corresponding sample by the fourth multiplication result to modify the sample near the minimal-value-corresponding sample.

3. An apparatus as recited in claim 1, wherein the first coefficient increases as the sample number detected by the second means decreases, and the second coefficient increases as the sample number detected by the third means decreases.

4. A computer readable medium storing a computer program for processing a digital audio signal having a sequence of samples, the computer program comprising the steps of:
   (1) detecting maximal values and minimal values represented by samples of the digital audio signal;
   (2) detecting a number of samples from a sample representing a minimal value detected by the step (1) to a maximal-value-corresponding sample representing a maximal value detected by the step (1);
   (3) detecting a number of samples from a sample representing a maximal value detected by the step (1) to a minimal-value-corresponding sample representing a minimal value detected by the step (1);
   (4) calculating a first difference between the maximal value represented by the maximal-value-corresponding sample and a value represented by a sample immediately preceding the maximal-value-corresponding sample;
   (5) calculating a second difference between the minimal value represented by the minimal-value-corresponding sample and a value represented by a sample immediately preceding the minimal-value-corresponding sample;
   (6) calculating a first coefficient from the sample number detected by the step (2);
   (7) calculating a second coefficient from the sample number detected by the step (3);
   (8) multiplying the first coefficient and the first difference to generate a first multiplication result;
   (9) multiplying the second coefficient and the second difference to generate a second multiplication result;
   (10) incrementing the maximal value, represented by the maximal-value-corresponding sample, by the first multiplication result to modify the maximal-value-corresponding sample; and
   (11) decrementing the minimal value, represented by the minimal-value-corresponding sample, by the second multiplication result to modify the minimal-value-corresponding sample.

5. A computer readable medium as recited in claim 4, wherein the computer program further comprises the steps of:
   (12) calculating a third coefficient from the sample number detected by the step (2);
   (13) calculating a fourth coefficient from the sample number detected by the step (3);
   (14) multiplying the third coefficient and the first difference to generate a third multiplication result;
   (15) multiplying the fourth coefficient and the second difference to generate a fourth multiplication result;
   (16) incrementing a value of a sample near the maximal-value-corresponding sample by the third multiplication result to modify the sample near the maximal-value-corresponding sample; and
   (17) decrementing a value of a sample near the minimal-value-corresponding sample by the fourth multiplication result to modify the sample near the minimal-value-corresponding sample.

6. A computer readable medium as recited in claim 4, wherein the first coefficient increases as the sample number detected by the step (2) decreases, and the second coefficient increases as the sample number detected by the step (3) decreases.

7. A method of processing a digital audio signal having a sequence of samples, the method comprising the steps of:
   (1) detecting maximal values and minimal values represented by samples of the digital audio signal;
   (2) detecting a number of samples from a sample representing a minimal value detected by the step (1) to a maximal-value-corresponding sample representing a maximal value detected by the step (1);
   (3) detecting a number of samples from a sample representing a maximal value detected by the step (1) to a minimal-value-corresponding sample representing a minimal value detected by the step (1);
   (4) calculating a first difference between the maximal value represented by the maximal-value-corresponding sample and a value represented by a sample immediately preceding the maximal-value-corresponding sample;
   (5) calculating a second difference between the minimal value represented by the minimal-value-corresponding sample and a value represented by a sample immediately preceding the minimal-value-corresponding sample;
   (6) calculating a first coefficient from the sample number detected by the step (2);
   (7) calculating a second coefficient from the sample number detected by the step (3);
   (8) multiplying the first coefficient and the first difference to generate a first multiplication result;
   (9) multiplying the second coefficient and the second difference to generate a second multiplication result;
   (10) incrementing the maximal value, represented by the maximal-value-corresponding sample, by the first multiplication result to modify the maximal-value-corresponding sample; and
   (11) decrementing the minimal value, represented by the minimal-value-corresponding sample, by the second multiplication result to modify the minimal-value-corresponding sample.

8. A method as recited in claim 7, further comprising the steps of:
   (12) calculating a third coefficient from the sample number detected by the step (2);
   (13) calculating a fourth coefficient from the sample number detected by the step (3);
   (14) multiplying the third coefficient and the first difference to generate a third multiplication result;
   (15) multiplying the fourth coefficient and the second difference to generate a fourth multiplication result;
   (16) incrementing a value of a sample near the maximal-value-corresponding sample by the third multiplication result to modify the sample near the maximal-value-corresponding sample; and
   (17) decrementing a value of a sample near the minimal-value-corresponding sample by the fourth multiplication result to modify the sample near the minimal-value-corresponding sample.

9. A method as recited in claim 7, wherein the first coefficient increases as the sample number detected by the step (2) decreases, and the second coefficient increases as the sample number detected by the step (3) decreases.

* * * * *